Figure 1:
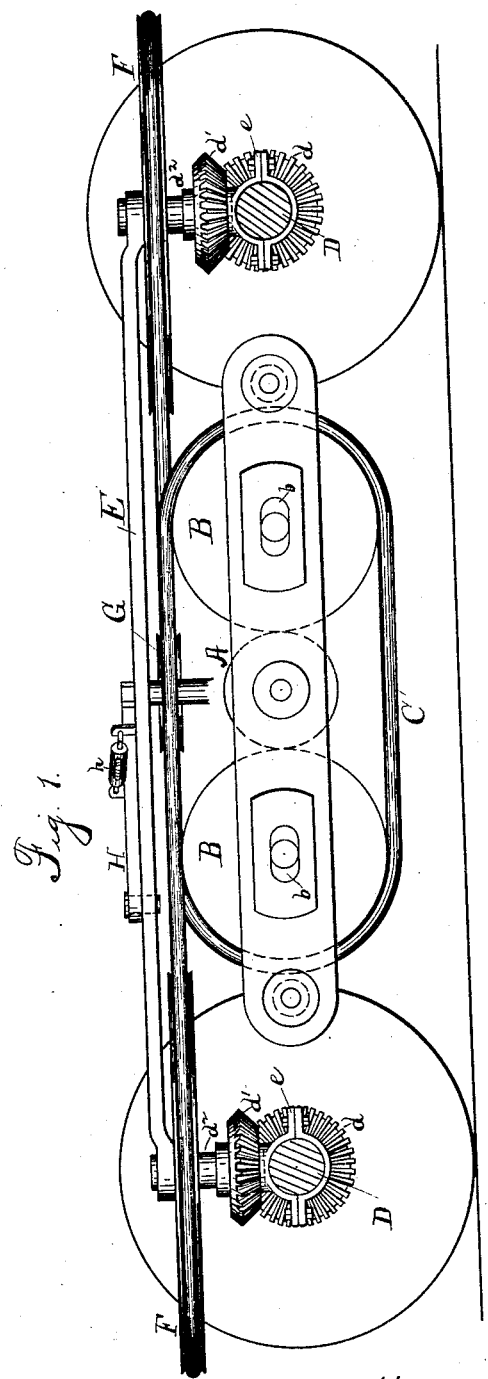

(No Model.)

W. B. CLEVELAND.
POWER TRANSMITTING MECHANISM.

No. 433,446. Patented Aug. 5, 1890.

2 Sheets—Sheet 1.

Witnesses
N. H. Fay
O. E. Potter

Inventor
Wm B. Cleveland
By his Attorneys
Hall and Fay

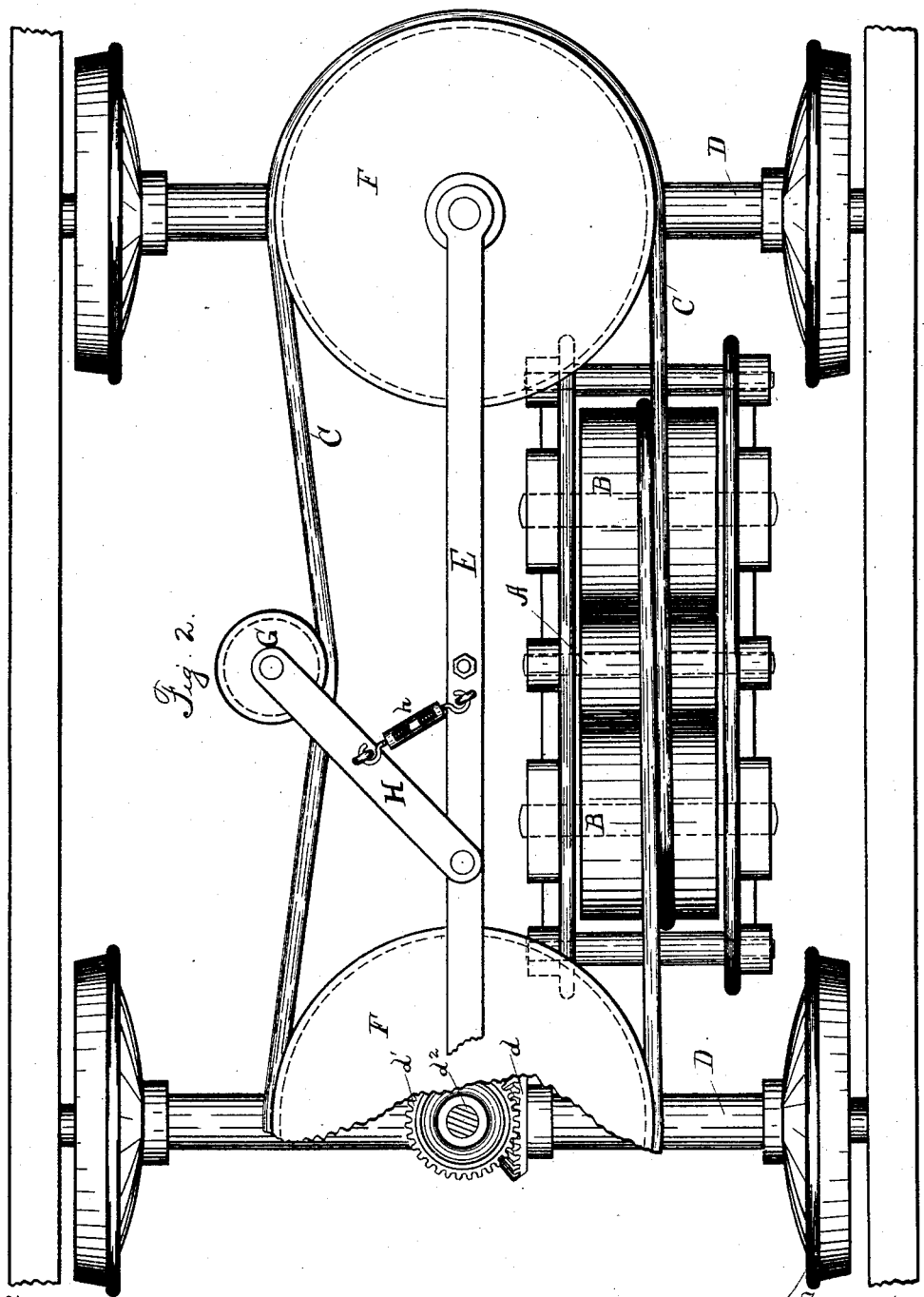

UNITED STATES PATENT OFFICE.

WILLIAM B. CLEVELAND, OF CLEVELAND, OHIO.

POWER-TRANSMITTING MECHANISM.

SPECIFICATION forming part of Letters Patent No. 433,446, dated August 5, 1890.

Application filed February 1, 1890. Serial No. 338,875. (No model.)

*To all whom it may concern:*

Be it known that I, WILLIAM B. CLEVELAND, a citizen of the United States, and a resident of Cleveland, county of Cuyahoga, and State of Ohio, have invented certain new and useful Improvements in Power-Transmitting Mechanism, of which the following is a specification, the principle of the invention being herein explained and the best mode in which I have contemplated applying that principle so as to distinguish it from other inventions.

My invention relates to power-transmitting mechanism, with especial reference to transmitting power from an electric motor to the driving-wheels of a street-car or other similar vehicle. My transmitting mechanism is designed especially to utilize the necessarily limited and confined space beneath the body of the car that is incident to street-car service.

The invention consists, essentially, of a motor having frictional contact with friction-drums, disks connected within the car-axles, and endless belt or chain mechanism connecting said drums and disks.

It further consists of other improvements hereinafter described and claimed.

Referring to the drawings, Figure 1 is a side elevation of a car-truck provided with my improved power-transmitting mechanism, certain portions being sectioned away and omitted. Fig. 2 is a plan view of the same mechanism, the car-body being omitted and certain portions of the truck being sectioned away or omitted.

A is the motor drum or cylinder journaled transversely of the car and having frictional contact with the friction-drums B, that are also journaled transversely of the car in the longitudinal grooves $b$, by means of which they may be moved longitudinally of the car as the endless belt or chain C is tightened or as the motor-drum or the friction-drums themselves become worn. The car-wheels are secured on the customary axles D, which are respectively provided with the bevel-gears $d$, that mesh with the respective bevel-gears $d'$, that are secured to the vertical shafts $d^2$. The lower extremities of said shafts are connected to the axles in any suitable manner, as by means of collars $e$, in which they are journaled, the upper extremities of said shafts being journaled in the respective opposite ends of the longitudinal brace E. Band-disks F are respectively secured to said shafts $d^2$ intermediate said brace and the bevel-gears $d'$. Said disks are provided with grooved peripheries in order to prevent the endless belt or chain or other endless driving mechanism C from slipping off from the disks. Said endless belt or chain mechanism passes around the opposite peripheries of the drums B and thence around the grooved peripheries of the disks F. Any slack that occurs in the belt is taken up by the idler G, having a grooved periphery in which said endless belt has bearing, said idler being journaled in the pivotal lever H, that has its opposite extremity pivoted to the brace E. A turn-buckle $h$ or suitable mechanism, as a spring, serves to regulate the tension of said idler against said belt.

Friction-drums B are intended to be kept in positive frictional engagement with the drum-motor at all times, and therefore it is that the endless belt should be kept taut, the particular utility of the loose journaling of said drums B being for the purpose of taking up any wear of said friction-drums or motor-drum. It will be noticed that the disks F have rotary movement in a plane at right angles to the plane of rotation of said drums B and A, or, in other words, in a horizontal plane. By this means I am enabled to utilize the limited and confined space below the car-body and between the car-trucks, and to use hand-disks of far greater diameter than I would otherwise be able to do if I attempted to rotate them in a vertical plane. This matter of space is a vital one in street-car operation. It will further be noticed that I am able in this one mechanical movement, by reason of the considerable size of the disks F, to transform the power of the motor into the necessary speed without the series of steps and gearing usually deemed requisite for such transformation.

I have shown a wire rope or cable as one form of endless-belt mechanism, but do not wish to limit or confine myself to its use only, as a chain or any other suitable flexible driving device may be used, and it is with this meaning that the term "endless" belt or band is used.

The foregoing description and accompanying drawings set forth in detail one mode of carrying out my method. Change may be made therein provided the principles of operation respectively recited in the following claims are retained and employed.

I therefore particularly point out and distinctly claim as my invention—

1. In power-transmitting mechanism, the combination of a motor-drum, friction-drums engaging therewith, disks adapted to rotate in a plane substantially at right angles to the plane of rotation of said friction-drums, an endless band connecting said friction-drums, and disks, and vehicle-wheels connected with said disks, substantially as set forth.

2. In power-transmitting mechanism, the combination of a motor-drum, friction-drums loosely journaled in slots extending transversely of the axes of said drums, vehicle-wheels, disks operatively connected with said wheels and adapted to rotate in a plane substantially at right angles to the plane of rotation of said friction-drums, and an endless band connecting said disks and friction-drums, substantially as set forth.

3. In power-transmitting mechanism, the combination of a motor-drum, friction-drums respectively engaging with said motor-drum, band-disks adapted to rotate in a plane substantially at right angles to the plane of rotation of said motor-drum, gearing connecting said disks, respectively, with the axles to be driven, and an endless band connecting said disks and friction-drums, substantially as set forth.

4. In a power-transmitting mechanism for street-cars and other similar uses, the combination of a motor-drum, friction-drums in frictional contact therewith, disks respectively connected with the car-axles by suitable gearing and rotating in a plane at right angles to the plane of rotation of said drums, endless-belt mechanism connecting said drums and disks, and belt-tightening-lever mechanism engaging with said endless belt, substantially as set forth.

In testimony that I claim the foregoing to be my invention I have hereunto set my hand this 29th day of January, A. D. 1890.

WM. B. CLEVELAND.

Witnesses:
J. B. FAY,
E. E. PATE.